United States Patent [19]

Le Pivert et al.

[11] Patent Number: 4,773,727
[45] Date of Patent: Sep. 27, 1988

[54] DEVICE FOR DISPLACING THE END OF AN OPTICAL FIBER ALONG TWO ORTHOGONAL AXES

[75] Inventors: Hervé Le Pivert, Paris; Bernard De Keyser, Calais; Gérard Normand, Besancon, all of France

[73] Assignee: Compagnie Lyonnaise De Transmissions Optiques, Clichy, France

[21] Appl. No.: 122,728

[22] Filed: Nov. 18, 1987

[30] Foreign Application Priority Data

Nov. 18, 1986 [FR] France .............................. 86 16007

[51] Int. Cl.⁴ .......................... G02B 6/36; B23Q 3/00
[52] U.S. Cl. ............................... 350/96.20; 350/96.10; 350/96.21; 29/468; 29/466; 29/467; 29/469.5
[58] Field of Search ............... 350/96.20, 96.10, 96.21, 350/96.22; 250/227; 279/5; 29/150, 861, 425, 425.5, 425.6, 721, 725, 243, 261, 283.5, 448, 449, 464, 466, 467, 468, 469.5

[56] References Cited

U.S. PATENT DOCUMENTS

| | | | |
|---|---|---|---|
| 4,352,542 | 10/1982 | Tydings | 350/96.21 |
| 4,368,949 | 1/1983 | Schmidt | 350/96.21 |
| 4,491,294 | 1/1985 | Blume et al. | 350/96.20 X |
| 4,615,097 | 10/1986 | Genequand | 29/466 |
| 4,687,287 | 8/1987 | Lukas et al. | 350/96.20 |
| 4,711,519 | 12/1987 | Smulders | 350/96.20 |
| 4,721,356 | 1/1988 | Soster et al. | 350/96.20 |

FOREIGN PATENT DOCUMENTS

| | | | |
|---|---|---|---|
| 0065096 | 11/1982 | European Pat. Off. | 350/96.20 |
| 0100781 | 2/1984 | European Pat. Off. | 350/96.20 X |
| 1960401 | 7/1970 | Fed. Rep. of Germany | 29/466 X |
| 2487527 | 1/1982 | France | 350/96.20 X |
| 2548390 | 1/1985 | France | 350/96.20 X |
| 2553200 | 4/1985 | France | 350/96.20 |
| 53-27042 | 3/1978 | Japan | 350/96.21 |
| 56-156812 | 12/1981 | Japan | 350/96.20 |
| 57-129403 | 8/1982 | Japan | 350/96.20 |
| 2080471 | 2/1982 | United Kingdom | 29/466 X |
| 2117916 | 10/1983 | United Kingdom | 350/96.20 |

Primary Examiner—William L. Sikes
Assistant Examiner—Brian M. Healy
Attorney, Agent, or Firm—Sughrue, Mion, Zinn, Macpeak & Seas

[57] ABSTRACT

A device for displacing the end of an optical fiber (6) along two orthogonal axes, the device enabling said optical fiber (6) to be aligned with another optical component (4) and comprising a frame (1) on which the optical component (4) is maintained together with a non-hinged deformable solid (10A, 10B) having thin blades (14A, 14B) on which the optical fiber to be aligned is fixed, the device being characterized in that the deformable solid is made as a single part and in that the thin blade-shaped portions thereof (14A, 14B) are disposed along the faces of a box-shape whose right cross-section at rest is square and is perpendicular to the axis of the optical fiber (6), one of the two ends of a diagonal of this box-shape being fixed to the frame (1) and the other being fixed to the optical fiber to be aligned, with the two ends of the other diagonal each constituting a thrust point for displacement means (20) enabling the right cross-section of the box-shape to be deformed.

10 Claims, 5 Drawing Sheets

DEVICE FOR DISPLACING THE END OF AN OPTICAL FIBER ALONG TWO ORTHOGONAL AXES

The present invention relates to a device of displacing the end of an optical fiber along two orthogonal axes, enabling said optical fiber to be aligned with another optical component, the device comprising a frame on which the optical component is held and a non-articulated deformable solid having thin blades on which the optical fiber to be aligned is fixed.

BACKGROUND OF THE INVENTION

It is known that one of the main causes of transmission loss along a long distance optical link arises from noncoincidence of the axes of two optical fibers which are connected to each other, e.g. by welding. This requirement of excellent co-incidence of the fiber axes, which is already of great importance for multimode optical fibers, becomes essential for monomode optical fibers which have a considerably smaller core diameter, of about 10 microns.

Initially, optical fiber connection was performed using micrometer displacement devices using slides driven by very fine pitch control screws, said slides being crossed or superposed in a manner suitable for enabling displacements in any direction in three dimensions. However, it was quickly observed that the backlash existing in such slides does not make it possible to obtain accuracies of about one tenth of a micrometer as required, in particular, for connecting monomode optical fibers.

Attempts have therefore been made to replace slide devices by displacement devices that make use of deformable solids.

A device is described, in particular by the document FR-A No. 2 548 390, whose deformable solid is a cantilevered beam operating by bending under the action of piezoelectric struts in two orthogonal planes. This beam comprises a succession of perpendicular hollows disposed along its axis and forming thin blades. This succession of hollows along the axis of a cantilevered beam gives rise to unwanted angular displacements of the end of the optical fiber which hinder proper alignment of said optical fiber with the optical component to which it is to be connected.

Preferred embodiments of the present invention provide a device for displacing the end of an optical fiber with better accuracy, and in particular a device which avoids unwanted rotation of the end of the optical fiber, and this is achieved by replacing the deformable solid constituted by a thin blade beam which is cantilevered and which operates in bending, by a deformable solid whose thin blades are disposed in a box shape with the cross-section of said box being perpendicular to the planes of the thin blades and to the axis of the optical fiber.

The document GB No. 2 080 471 describes a micromanipulator using pairs of thin blades acting as springs and disposed along the faces of a box shape, with the edges of the box being constituted by prismatic blocks in which the ends of the thin blades are fixed.

The accuracy of the displacements obtained with such a device is not sufficient. It is very difficult to fix thin blades to prismatic angle blocks without any angular or longitudinal backlash. In addition, the blades are of constant cross-section such that the bending stress varies along a blade. Its value is at a maximum in the immediate vicinity of the angle blocks. Also, some of the substance in the middle regions of the blades is not only useless, but is also harmful, since it reduces the deformation of the blade when subjected to a given force.

The deformable solid of the present invention is made as a single part in order to avoid any geometrical defects due to assembling a plurality of distinct parts and to avoid any possibility of movement of one part relative to another. In addition, the blades of this deformable solid are of reduced thickness in their middle regions, with the variation in thickness from one end to the middle region being such that the stress in the material is substantially the same in any right cross-section of the blade.

SUMMARY OF THE INVENTION

The device in accordance with the invention is characterized in that the deformable solid is made as a single part, and in that its portions in the form of thin blades are disposed along the faces of a box shape whose cross-section at rest is square and is perpendicular to the axis of the optical fiber, the two ends of one of the diagonals of this box shape being fixed respectively to a support and to the optical fiber to be aligned, with the two ends of the other diagonal each constituting a thrust point for displacement means serving to deform the cross-section of the box shape.

The invention preferably also includes at least one of the following characteristics:

the cross-sections of the thin blades taper from each end towards a region situated at the same distance from both ends;

the mathematical law by which the cross-sections of the blades taper is such that the stress in the material is substantially the same at any right cross-section of a blade;

each face of the box-shape is constituted by a single thin blade;

each face of the box-shape is constituted by two parallel thin blades whose profiles are symmetrical to each other about a plane equidistant from both blades; and a flexible element extending substantially parallel to a thin blade is interposed between each end of a diagonal constituting a thrust point and each displacement means.

BRIEF DESCRIPTION OF THE DRAWINGS

Embodiments of the invention are described by way of example with reference to the accompanying drawings, in which.

MORE DETAILED DESCRIPTION

Figure 1:
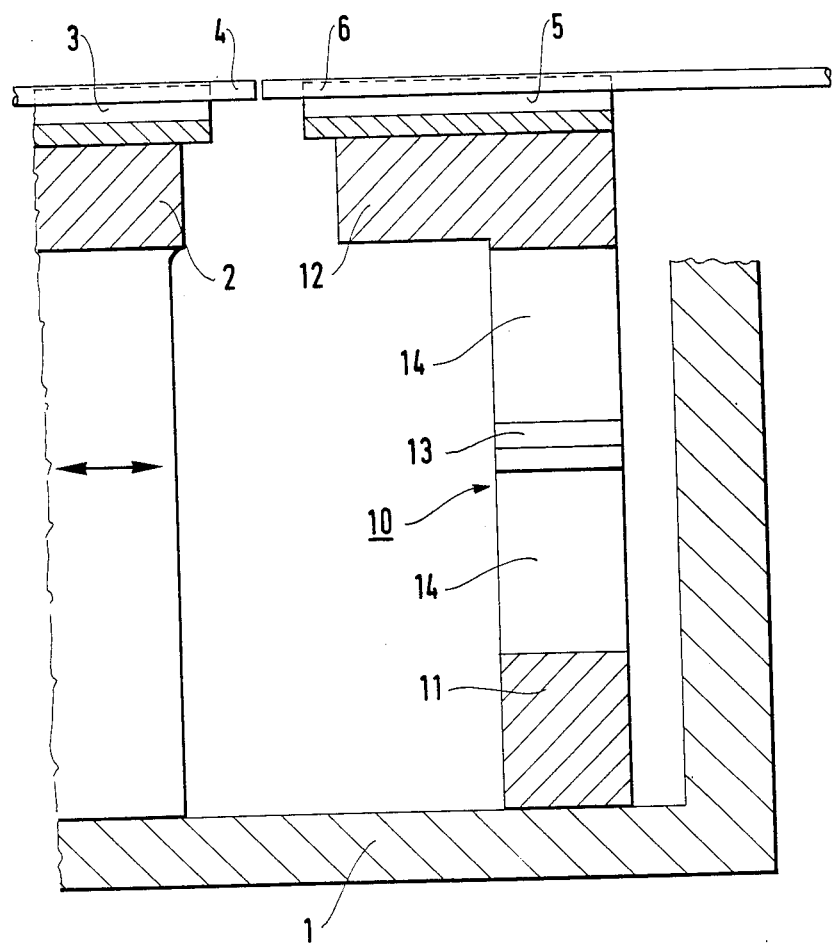
FIG. 1 is a longitudinal section through the device.

In FIG. 1, the device comprises a fixed frame 1, a support 2 sliding on the frame 1, and a one-piece deformable solid 10 including four prismatic blocks and four sides constituted by thin blades 14. The four prismatic blocks comprise a base 11 fixed to the frame 1, a support block 12, and two maneuvering blocks 13. The manuevering blocks 13 and the thin blades 14 are clearly visible in FIGS. 2 and 3.

The support 2 includes a V-groove 3 in which an optical fiber 4 is disposed. The support block 12 of the deformable solid 10 includes a V-groove 5 in which the optical fiber 6 to be aligned therewith is disposed. The two optical fibers are naturally held in their respective V-grooves by conventional means (not shown).

The deformable solid 10 thus serves to align the optical fiber 6 with the optical fiber 4 by displacing the end of the optical fiber 6 in two orthogonal planes, together with longitudinal displacement of the support 2 along a third plane which is orthogonal to the other two in order to bring the fiber 4 towards the fiber 6.

Figure 2:
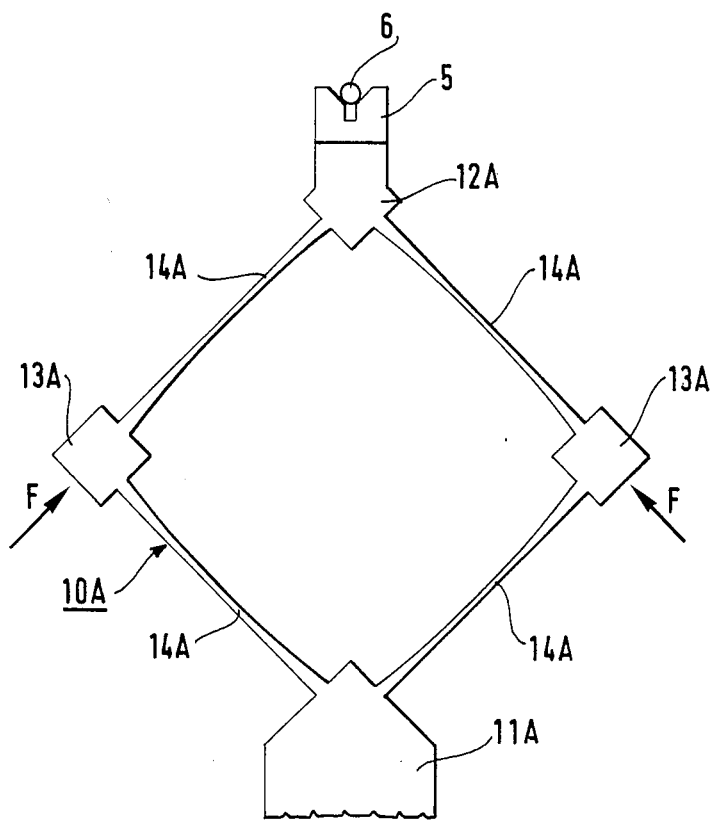
FIG. 2 is a front view of a first embodiment of the deformable solid.

FIG. 2 shows a first embodiment of the deformable solid 10A whose right cross-section comprises four sides, each constituted by a single blade 14A.

The four thin blades 14A constitute a square with one end of its vertical diagonal being constituted by the base 11A, its other end being constituted by the support block 12A, and with each end of its horizontal diagonal being constituted by a maneuvering block 13A. The ends of the thin blades are perpendicular to the faces of the blocks and their right cross-sections taper in thickness down in the middle, with their profiles thus corresponding to two uniform strength beams placed end-to-end and interconnected by their thin ends. As a result, the stress in the material is substantially identical in any right cross-section of the blades. Each maneuvering block 13A is subjected to thrust in the direction of arrows F by any appropriate displacement means, e.g. a micrometer screw or a piezoelectric strut.

Figure 3:
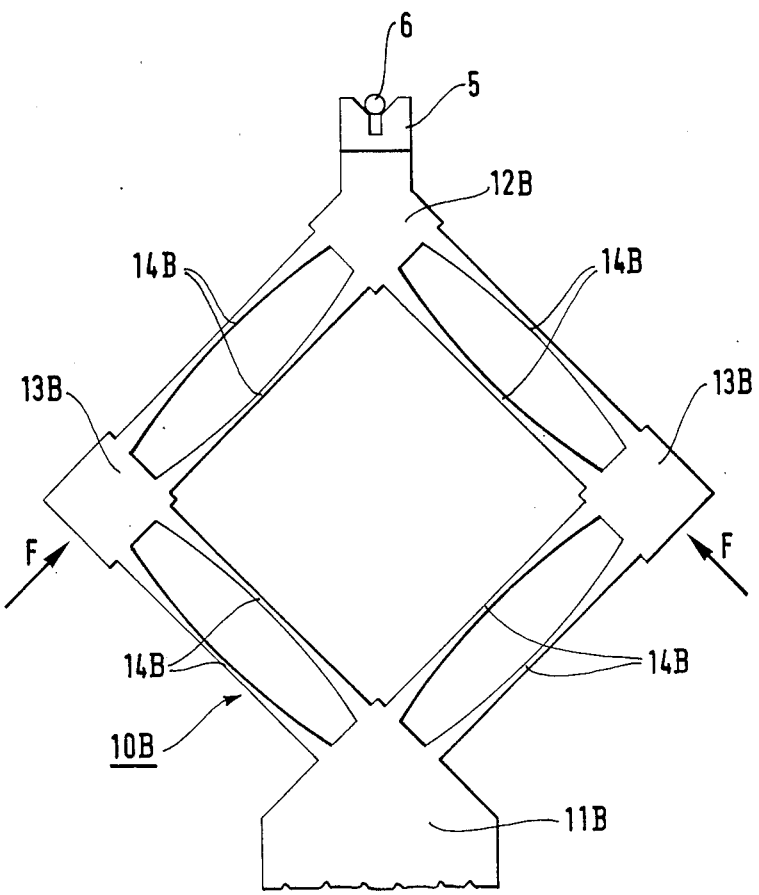
FIG. 3 is a front view of a second embodiment of the deformable solid.
Figure 4:
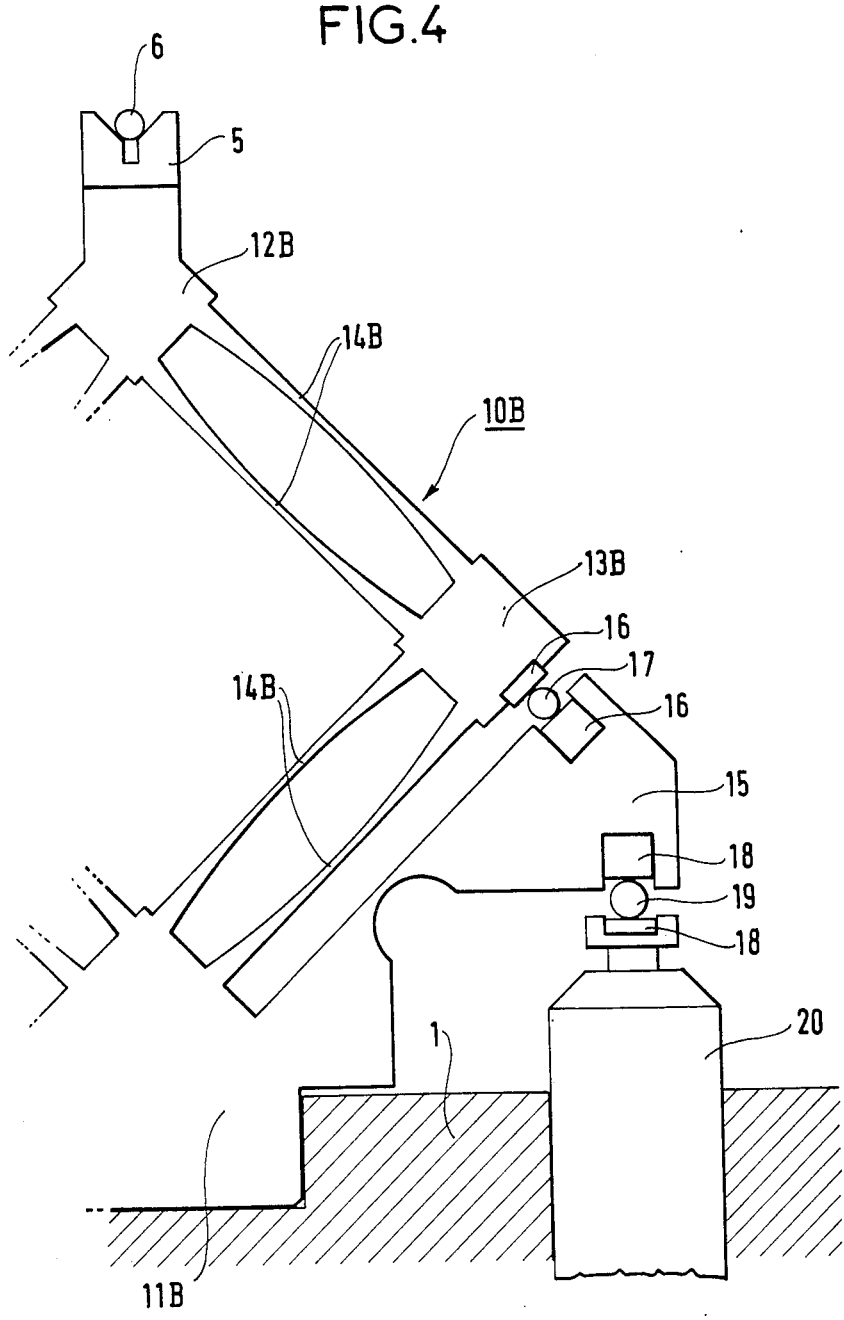
FIG. 4 shows half of FIG. 3 in greater detail.

FIGS. 3 and 4 show a second embodiment of the deformable solid 10B.

FIG. 3 shows the solid 10B comprising four sides, each of which is constituted by two parallel thin blades 14B.

The four groups of two parallel thin blades 14B form a square with one end of its vertical diagonal being constituted by the base 11B, the other end being constituted by the support block 12B, and with each end of its horizontal diagonal being constituted by a maneuvering block 13B. The ends of the thin blades are perpendicular to the faces of the blocks and their right cross-sections taper in thickness in the middle such that their profiles correspond to pairs of uniform strength beams placed end-to-end and interconnected at their thin ends. In each group of thin blades, the profiles of the blades are symmetrical to each other about the plane which is equidistant from both blades. Each maneuvering block is subjected to thrust from suitable displacement means along the direction of arrows F.

FIG. 4 shows a particular displacement means constituted by a piezoelectric strut 20 and an intermediate flexible element 15, with the special shape of this flexible element 15 making it possible to place the strut 20 vertically in order to reduce the size of the device as a whole. The mechanical connection between the maneuvering block 13B and the element 15 is provided by two tabs 16 clamping on a cylinder 17, and the mechanical connection between the flexible element 15 and the piezoelectric strut 20 is provided by two tabs 18 clamping on a cylinder 19. The use of a cylinder clamped between two tabs makes it possible to obtain purely linear thrust.

Figure 5:
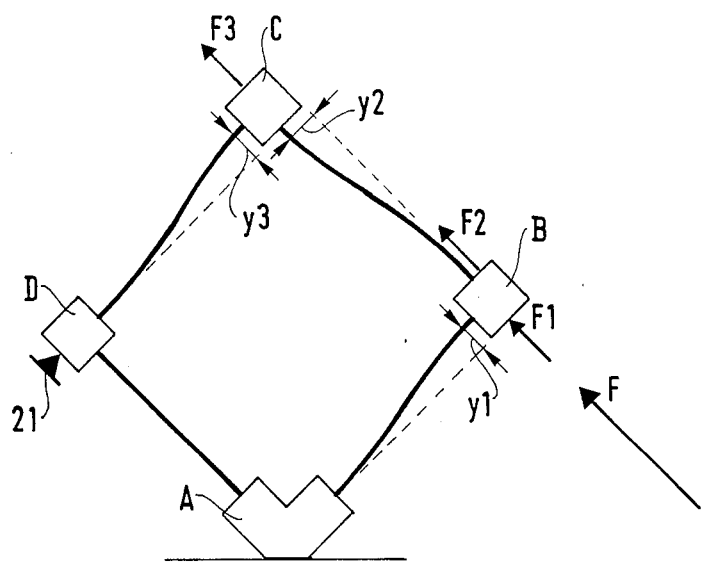
FIG. 5 is a diagram showing a box shape which is deformed under the action of a force F which is decomposed into three forces F1, F2, F3.

The operation of the device in accordance with the invention is described with reference to FIG. 5.

In this device, the square section box shape is constituted by four mutually perpendicular thin blades and by four prismatic blocks, with one block A being fixed to the frame of the apparatus, another block C supporting the optical fiber and being subjected to the transverse displacements applied to the blocks B and D by the forces applied along two directions which are perpendicular to the sides AB and AD, respectively.

The displacements caused by each of the applied forces are considered separately, and in particular the displacement caused by the force F applied to block B. This force causes block B to move and thus moves block C, while block D remains stationary along the initial AD direction by virtue of an abutment 21.

The force F can be decomposed into three forces F1, F2, and F3 acting in the same direction, with F1 causing the side AB to bend, F2 causing the side BC to buckle, and F3 causing the side DC to bend. The lateral displacements relative to the initial rest directions are respectively designated y1, y2, and y3.

In theory, the displacement y1 is the displacement of the end of a beam which is prevented from rotating (i.e. is "encastré") at both ends, with one of the ends being fixed and the other being displaceable along a direction which is perpendicular to the initial axis of the beam. Beam calculatiosn give the displacement $y1_O$ of a beam of length 1 and of uniform right cross-section subjected at its free end to a force F1 perpendicular to the axis of the beam as follows:

$$y1_0 = \frac{F1 \cdot l^3}{12 \cdot E \cdot I_0}$$

Where E is the modulus of elasticity of the material and $I_O$ is its moment of inertia. (Note that lower case letter "l" and digit "1" are distinct in this typeface).

In the present case where the cross-section of the blades is constituted by two equal strength profiles mounted end-to-end, beam calculation shows that the beam bending obtained is twice that which would be obtained for a beam of uniform right cross-section. The moment of inertia $I_O$ is then calculated at an "encastré" and in the present case the appropriate point is the end of a blade. The real deflection then observed is:

$$y1 = \frac{F1 \cdot l^3}{6 \cdot E \cdot I_0}$$

In theory, the displacement y2 is the displacement due to the buckling of a beam of uniform right cross-section under the action of the force F2 acting on the block B, with both ends of B and C being "encastré" constrained to retain a substantially fixed orientation.

y2 can be calculated using the following equation given by P. Montel in the book "Statique et resistance des materiaux":

$$y2_0 = 2\sqrt{2} \ \frac{l}{\pi} \ \sqrt{\frac{F2 - F0}{F0}}$$

where F0 is the critical force given by the formula:

$$F0 = 4\pi \frac{2 \cdot E \cdot I_0}{l^2}$$

If the applied force F2 is less than F0, *there is no buckling* and the side BC is not deformed.

The displacement y2 when the cross-section of the blades is constituted by two equal strength profiles is twice the above value, i.e., $$y2_0 = 4\sqrt{2} \; \frac{1}{\pi} \; \sqrt{\frac{F2 - F0}{F0}}$$

However, if the force F2 is not greater than F0, there is no buckling and y2=0.

The displacement y3 under the action of F3 is of the same nature as the displacement of the block B under the action of the force F1 and is calculated using the formula:

$$y3 = \frac{F3 \cdot l^3}{6 \cdot E \cdot I_0}$$

The displacements y1, y2, and y3 can thus be calculated from the three applied forces F1, F2, and F3 which are subjected to the relationship F1+F2+F3=F, from the length l of the blades, from the moment of inertia $I_0$ calculated at the ends of the blades, and from the modulus of the elasticity E of the material.

The only problem that needs solving is how to calculate the forces F1, F2, and F3.

When there is *no buckling* of the side BC, which is true for very small displacements, particularly when the blades are in pairs, it may be assumed that F2=0 and that F1=F3=F/2, whence $$y1 = y3 = \frac{F \cdot l^3}{12 \cdot E \cdot I_0}$$

The moment of inertia $I_0$ can be calculated from the width b of the blades and from their thickness h in the vicinity of their ends, using the equation: $I_0 = bh^3/12$, whence the following formula relating the displacement y1 to the force F:

$$y1 = \frac{F \cdot l^3}{E \cdot bh^3}$$

The deformable solid is made as a single part of an isotropic material and separate parts are not assembled. There is thus no possibility of the ends of any of the blades moving relative to the prismatic blocks to which they are connected.

Thus, when there is *no buckling of the blade BC* under the action of the force F applied at B, the side BC remains substantially parallel to the side AD which is held at rest by the strut 21 such that the transverse displacement applied to the block C supporting the optical fiber takes place in a fixed direction, *with no interfering rotation* about the initial direction, at least to within a second order approximation.

The same is true when the strut situated at D is activated, in which case the displacement is perpendicular to the first displacement and is directed along DC, without rotation about the initial direction.

This confirms the fact that, in such an assembly, the optical fiber positioned in the V-groove connected to block C (and thus to block 12A or 12B depending on the embodiment), *is not subject to rotation* relative to its *initial plane of polarization*. This is very important for monomode optical fibers since, in fact, they propagate an infinity of modes which are related to one another by rotation about the axis of the fiber. The axis of the fiber has different optical characteristics depending on the orientation of a plane of polarization, either by virtue of natural imperfections, or else by design (i.e. accidental birefringence, or else desired birefringence in polarization-maintaining fibers), and this is a major drawback for transmitting wideband signals and applies a much more drastic limit on the transmitted frequency band than that which is due to other characteristics of the fiber. From which it can be seen that such a device presents a great advantage when connecting two monomode fibers to each other.

We claim:

1. A device for displacing the end of an optical fiber along two orthogonal axes, the device enabling said optical fiber to be aligned with another optical component and comprising a frame, means on said frame for supporting the optical component, a non-hinged deformable solid having thin blades, means for fixing the optical fiber to be aligned with said optical component on said solid, the improvement wherein the deformable solid is made as a single part and said deformable solid is of a box-shape having thin blades disposed on four sides thereof, said box-shape deformable solid having a right cross-section, at rest, which is square and perpendicular to the axis of the optical fiber, said deformable solid having one of two ends of a first diagonal fixed to the frame and the other end having fixed thereto the optical fiber to be aligned, and said deformable solid having two ends of a second diagonal each constituting a thrust point for displacement means enabling the right cross-section of the box-shape deformable solid to be deformed to effect alignment of said optical fiber in two right angle directions relative to said optical component.

2. A device according to claim 1, wherein the thin blades taper in thickness from each end towards a region situated at the same distance from both ends.

3. A device according to claim 2, wherein the mathematical law by which the cross-sections of the blades taper is such that the stress in the material is substantially the same at any right cross-section of a blade.

4. A device according to claim 1, wherein each face of the box-shape deformable solid is constituted by a single thin blade.

5. A device according to claim 1, wherein each face of the box-shape deformable solid is constituted by two parallel thin blades whose profiles are symmetrical to each other about a plane equidistant from both blades.

6. A device according to claim 1, wherein a flexible element extending substantially parallel to a thin blade is interposed between each end of a diagonal constituting a thrust point and each displacement means.

7. A device according to claim 2, wherein each face of the box-shape deformable solid is constituted by a single thin blade.

8. A device according to claim 3, wherein each face of the box-shape deformable solid is constituted by a single thin blade.

9. A device according to claim 2, wherein each face of the box-shape deformable solid is constituted by two parallel thin blades whose profiles are symmetrical to each other about a plane equidistant from both blades.

10. A device according to claim 3, wherein each of the box-shape deformable solid is constituted by two parallel thin blades whose profiles are symmetrical to each other about a plane equidistant from both blades.

* * * * *